United States Patent [19]

Kawai et al.

[11] Patent Number: 5,771,100
[45] Date of Patent: Jun. 23, 1998

[54] METHOD OF MEASURING DIMENSION OF MOLD OR MOLD-ASSOCIATED COMPONENT BY LASER MEASURING INSTRUMENT

[75] Inventors: Etsuzo Kawai; Shigeaki Yamamoto, both of Toyohashi, Japan

[73] Assignee: Sintokogio, Ltd., Nagoya, Japan

[21] Appl. No.: 849,559

[22] PCT Filed: Sep. 27, 1995

[86] PCT No.: PCT/JP95/01954

§ 371 Date: Aug. 4, 1997

§ 102(e) Date: Aug. 4, 1997

[87] PCT Pub. No.: WO97/12199

PCT Pub. Date:Apr. 3, 1997

[51] Int. Cl.$^6$ .............................. G01B 11/22; G01B 11/24
[52] U.S. Cl. ............................................ 356/378; 356/376
[58] Field of Search ..................................... 356/378, 376, 356/383

[56] References Cited

U.S. PATENT DOCUMENTS 5,146,779   9/1992   Sugimoto et al. ....................... 356/378

FOREIGN PATENT DOCUMENTS 62-21009   1/1987   Japan .............................. G01B 11/14
2-272308   11/1990   Japan .............................. G01B 11/24
4-84707   3/1992   Japan .............................. G01B 11/24

*Primary Examiner*—Frank G. Font
*Assistant Examiner*—Amanda Merlino
*Attorney, Agent, or Firm*—Limbach & Limbach L.L.P.

[57]  ABSTRACT

A method of accurately measuring a dimension of a mold or the like by a laser measuring instrument is provided. The method comprises a first step of directing a laser emitting portion of a laser measuring instrument to the inner surface of a first angle portion of opposing angle portions of a mold whose dimension is to be measured, at a suitable angle of inclination, moving the laser measuring instrument relative to the mold in a direction substantially parallel to the mold surface so as to continuously measure points near the first angle portion, expressing measurements on two arbitrary points on a first surface of the first angle portion in x-y coordinates, obtaining an equation relating to the x-y coordinates on the two points as a regression line by the method of least squares, similarly obtaining an equation relating to x-y coordinates on two arbitrary points on a second surface, which forms the first corner portion with the first surface, as a regression line by the method of least squares, and calculating the intersection of these two regression lines as a position of the first corner portion, a second step of calculating a position of a second angle portion of the opposing angle portions in the same way as the first step, and a third step of calculating the distance between the first and second angle portions.

1 Claim, 2 Drawing Sheets

5,771,100

METHOD OF MEASURING DIMENSION OF MOLD OR MOLD-ASSOCIATED COMPONENT BY LASER MEASURING INSTRUMENT

TECHNICAL FIELD

This invention relates to a method of measuring a dimension of a mold or mold-associated component by a laser measuring instrument, and particularly to a method of measuring an inner dimension of a mold or a distance between the laser measuring instrument and a mold or mold-associated component, wherein the laser measuring instrument is disposed above and moved alongside a surface of the mold or mold-associated component to emit a laser beam on surfaces of the mold and/or mold-associated component and the laser spots produced on the surfaces are observed.

BACKGROUND ART

Recently, to enhance the quality of castings so that no staggers or casting fins are produced on the surfaces of the castings, the dimensions of the molding cavities of molds have had to be accurate. Thus it is suggested to measure the dimensions of a molding cavity and thereby to determine if they are allowable or not. As one method of measuring dimensions of the cavity of a mold, a laser measuring instrument is used that emits a laser beam in a predetermined direction.

However, when a dimension of a molding cavity is measured by using such a laser measuring instrument which emits a laser beam in a predetermined direction, the laser beam spot produced on a surface of a mold is selected to be in such a large size that the spot itself is not located between heat-resistant particles of the mold. Thus, when a spot is produced on an angle or edge portion of a mold, the spot bridges the two surfaces that define the angle portion. This makes it impossible to see the precise location of the spot. Further, if a distance between opposing angle portions of a molding cavity is short in comparison with the size of the laser measuring instrument, the instrument cannot be moved to the required positions that correspond to the angle portions of the cavity. Accordingly, no method of accurately measuring a dimension of a molding cavity by a laser measuring instrument has been invented.

This invention is conceived in view of that problem. It aims to provide a method to measure an inner dimension of a mold or a distance between a mold and a mold-associated component.

DISCLOSURE OF INVENTION

To achieve the above purpose of this invention, the method of the present invention of measuring an inner dimension of a mold or a distance between a mold and a mold-associated component by a laser measuring instrument disposed above a surface of at least the mold such that the instrument is movable alongside the surface of the mold to emit a laser beam or the like on surfaces of at least the mold, includes first, second, and third steps, wherein the first step includes disposing a laser emitting portion of the laser emitting instrument such that it inclines toward an inner surface of a first angle portion of opposing angle portions of a mold or mold-associated component to be measured, moving the instrument and the mold or mold-associated component relative to each other in a direction parallel to the surface of the mold to thereby successively measure points near the first angle portion on first and second surfaces which define the first angle portion, expressing the measurements on two arbitrary points on the first surface in x-y coordinates and obtaining an equation relating to the x-y coordinates for the two points as a regression line by the method of least squares, similarly obtaining an equation relating to x-y coordinates for two arbitrary points on the second surface, and calculating the intersection of the two regression lines as a position of the first angle portion, wherein the second step includes disposing the laser emitting portion of the laser emitting instrument such that it inclines toward an inner surface of a second angle portion of the opposing angle portions of the mold or mold-associated component, moving the instrument relative to the mold or mold-associated component in a direction parallel to the surface of the mold to thereby successively measure points on first and second surfaces near the second angle portion, which first and second surfaces define the second angle portion, expressing the measurements on two arbitrary points on the first surface in x-y coordinates and obtaining an equation relating to the x-y coordinates for the two points as a regression line by the method of least squares, similarly obtaining an equation relating to x-y coordinates for two arbitrary points on the second surface, and calculating the intersection of the two regression lines as a position of the second angle portion, wherein the third step includes calculating the distance between the positions of the first and second portions.

It should be noted that in this specification and claims the term "a mold" means one that has a molding cavity or a V-shaped groove (below explained) or the like formed in the mold for showing its position. Further, the term "a mold-associated component" means a flask, a bush for determining the position of a flask, or the like. Further, a first or second angle portion means an angle (edge) portion of a molding cavity, a V-shaped groove formed in a core of a mold for showing its position (a reference for the core), a V-shaped groove formed in a mold (a reference for the mold), a V-shaped groove formed in a mold-associated component, or the like. The vertical surface of the first or second angle portion need not be at 90 degrees to the horizontal. Further, the angle portion may be an internal angle portion such as the bottom portion of a V-shaped groove, and in that case a laser measuring instrument need not be inclined, because its laser-emitting portion is inclined toward a surface to be measured.

BEST MODE FOR CARRYING OUT THE INVENTION

Figure 1:
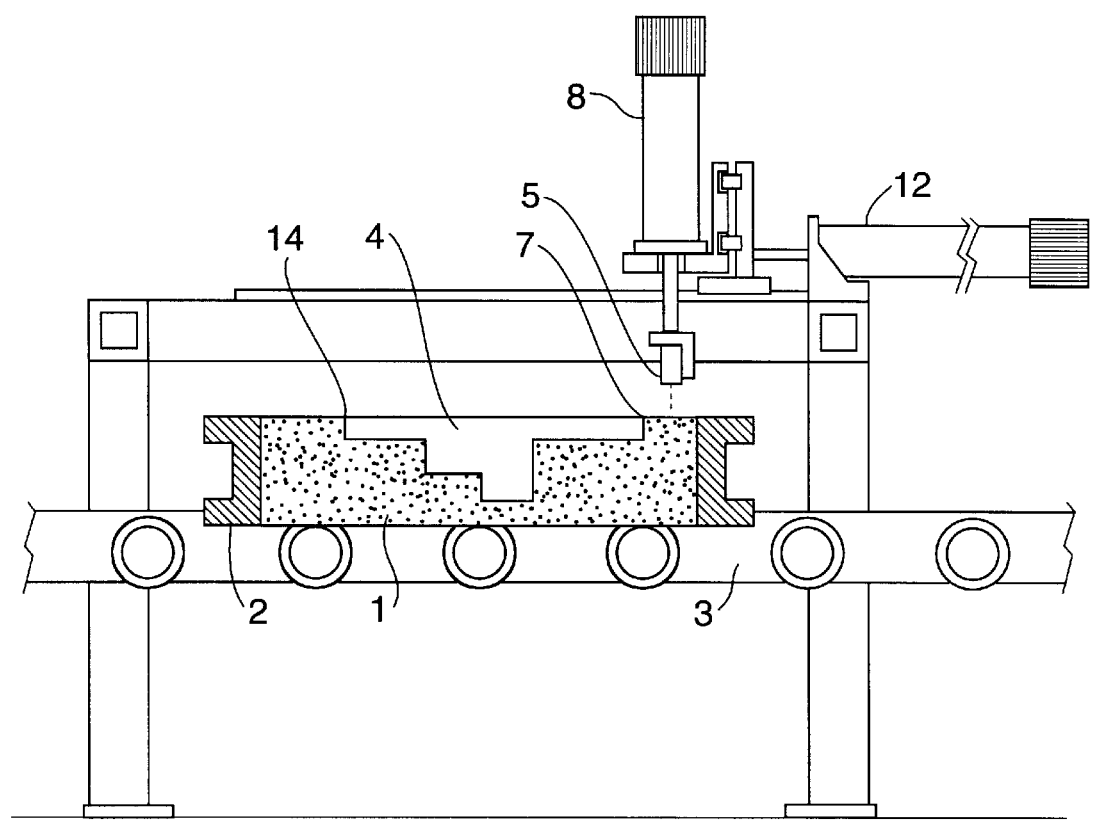
FIG. 1 is a schematic front view of an embodiment of a device which carries out the present invention.

An embodiment of the invention will now be explained by reference to FIGS. 1 and 2. As shown in the front view (FIG. 1), a flask 2, which holds a mold 1, is intermittently conveyed to the left by a roller conveyor 3, which is provided with rollers having collars, and is stopped in predetermined positions. Then a horizontal electric cylinder (not shown) is activated to move a laser measuring instrument 5 in a direction perpendicular to the sheet, to a position where a dimension of a molding cavity 4 is measured. As shown in the enlarged front view of the main part (FIG. 2), a laser-emitting portion 6 of the laser measuring instrument 5 is then inclined toward an inner surface 4b of a first angle portion 7 of two angle portions 7, 14 of the cavity 4, a dimension of which cavity is now measured. A vertical cylinder 8, which faces down, is then activated to locate the laser measuring instrument in a position such that the height of the instrument from a surface 4a of the mold can be measured. The distance of the movement of the laser measuring instrument 5 is measured by an encoder (not shown) attached to the cylinder 8.

Figure 2:
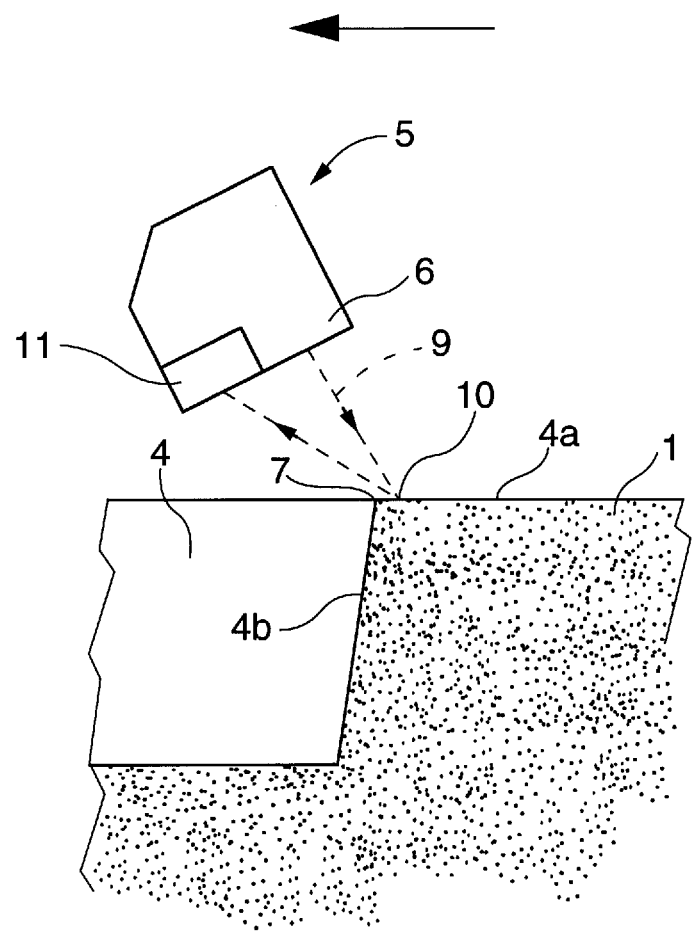
FIG. 2 is a front view in an enlarged scale of the main part of the device of FIG. 1.

As in FIG. 2, a laser beam is emitted from the portion 6 of the laser measuring instrument 5 on the surface 4a, and a laser spot 10 (photo mark) produced on the surface of the mold 1 is observed by a photo-receptive portion 11 of the laser measuring instrument 5. Under this state, the instrument 5 is moved left to a position by an electric cylinder 12, and a laser spot produced on the surface is observed by the photo-receptive portion 11. This process is repeated. Since the laser-emitting portion 6 of the instrument 5 is appropriately inclined toward the measured surface 4b of the first angle portion 7, a laser spot is properly produced on the vertical surface 4b even if it is at about 90 degrees to the horizontal surface 4a. The measurements for the laser spots (points on the surfaces) are expressed in x-y coordinates by a recorder (not shown).

The measurements on the two laser spots (points) that are arbitrarily selected from all the measured spots on the horizontal surface 4a of the first angle portion 7 are expressed in x-y coordinates. An equation relating to the x-y coordinates for the two laser spots is obtained as a regression line by the method of least squares. Similarly, an equation relating to x-y coordinates for two arbitrary laser spots on the vertical surface 4b is obtained as a regression line by the method of least squares. Calculating the intersection of these two regression lines gives the position of the first angle portion.

The laser measuring instrument 5 is then inclined toward the horizontal surface of the mold such that the instrument faces an inner surface of the second angle portion 14. The horizontal cylinder 12 is then activated to move the instrument 5 to a position near the second angle portion 14. The position of the second angle portion 14 is determined in a similar way to obtain that of the first angle portion 7. The distance between the first and second angle portions 7, 14 is calculated from data from an encoder, which is attached to the electric cylinder 12. Thus a dimension of the cavity 4 at a desired position is obtained.

Although in the above embodiment the laser measuring instrument is moved to measure a dimension of the cavity of a mold, alternatively, the mold itself may be moved.

Further, a V-shaped groove may be formed in a surface of the mold 1 or flask 2, and the distance between this groove and the first or second angle portion may be measured. Alternatively, a V-shaped groove is formed in a core which is set in a mold, and the distance between this V-shaped groove formed in the core and the V-shaped groove formed in the surface of the mold may be measured.

As is clear from the foregoing description, the method of the present invention of measuring an inner dimension of a mold or a distance between a mold and a mold-associated component by a laser measuring instrument disposed above a surface of at least the mold such that the instrument is movable alongside the surface of the mold to emit a laser beam or the like on surfaces of at least the mold, includes first, second, and third steps, wherein the first step includes disposing a laser emitting portion of the laser emitting instrument such that it inclines toward an inner surface of a first angle portion of opposing angle portions of a mold or mold-associated component to be measured, moving the instrument relative to the mold or mold-associated component in a direction parallel to a surface of the mold to thereby successively measure points on first and second surfaces near the first angle portion, which first and second surfaces define the first angle portion, expressing the measurements on two arbitrary points on the first surface in x-y coordinates and obtaining an equation relating to the x-y coordinates for the two points as a regression line by the method of least squares, similarly obtaining an equation relating to x-y coordinates for two arbitrary points on the second surface, and calculating the intersection of the two regression lines as a position of the first angle portion, wherein the second step includes disposing the laser emitting portion of the laser emitting instrument such that it inclines toward an inner surface of a second angle portion of the opposing angle portions of the mold or mold-associated component, moving the instrument relative to the mold or mold-associated component in a direction parallel to the surface of the mold to thereby successively measure points on first and second surfaces near the second angle portion, which first and second surfaces define the second angle portion, expressing the measurements on two arbitrary points on the first surface in x-y coordinates and obtaining an equation relating to the x-y coordinates for the two points as a regression line by the method of least squares, similarly obtaining an equation relating to x-y coordinates for two arbitrary points on the second surface, and calculating the intersection of the two regression lines as a position of the second angle portion, wherein the third step includes calculating the distance between the positions of the first and second portions. Thus the present invention has an advantage in that it can accurately measure dimensions of a mold at desired positions even if the distance between opposing angle portions of the mold is short.

We claim:

1. A method of measuring an inner dimension of a mold or a distance between a mold and a mold-associated component by a laser measuring instrument disposed above a surface of at least the mold such that the instrument is movable alongside the surface of the mold to direct a laser beam on surfaces of at least the mold, comprising:

a first step, including the steps of disposing a laser emitting portion of the laser emitting instrument such that the laser emitting portion inclines toward an inner surface of a first angle portion of opposing angle portions of a mold or mold-associated component to be measured; moving the instrument relative to the mold or mold-associated component in a direction parallel to a surface of the mold to thereby successively measure points on first and second surfaces near the first angle portion, which first and second surfaces define the first angle portion; expressing the measurements on two arbitrary points on the first surface in x-y coordinates and obtaining an equation relating to the x-y coordinates for the two points as a regression line by the method of least squares; similarly obtaining an equation relating to x-y coordinates for two arbitrary points on the second surface; and calculating the intersection of the two regression lines as a position of the first angle portion, a second step, including disposing the laser emitting portion of the laser emitting instrument such that the laser emitting portion inclines toward an inner surface of a second angle portion of the opposing angle portions of the mold or mold-associated component; moving the instrument and the mold or mold-associated component relative to each other in a direction parallel to a surface of the mold to thereby successively measure points near the second angle portion on third and fourth surfaces which define the second angle portion; expressing the measurements on two arbitrary points on the third surface in x-y coordinates and obtaining an equation relating to the x-y coordinates for the two points as a regression line by the method of least squares; similarly obtaining an equation relating to x-y coordinates for two arbitrary points on the fourth surface, and calculating the intersection of the two regression lines as a position of the second angle portion, and a third step of calculating the distance between the positions of the first and second portions.

\* \* \* \* \*